United States Patent
Fujita et al.

(10) Patent No.: US 12,358,059 B2
(45) Date of Patent: Jul. 15, 2025

(54) CUTTING TOOL AND METHOD FOR MACHINING WORKPIECE

(71) Applicant: MAKINO MILLING MACHINE CO., LTD., Tokyo (JP)

(72) Inventors: Hidekazu Fujita, Fujiyoshida (JP); Kouji Ono, Fujiyoshida (JP); Hiroshi Ueno, Fujiyoshida (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 413 days.

(21) Appl. No.: 17/904,936

(22) PCT Filed: Mar. 31, 2021

(86) PCT No.: PCT/JP2021/013983
§ 371 (c)(1),
(2) Date: Aug. 24, 2022

(87) PCT Pub. No.: WO2021/201153
PCT Pub. Date: Oct. 7, 2021

(65) Prior Publication Data
US 2023/0088133 A1   Mar. 23, 2023

(30) Foreign Application Priority Data
Mar. 31, 2020   (JP) .................. 2020-064561

(51) Int. Cl.
*B23C 3/00*   (2006.01)
*B23C 3/16*   (2006.01)
(Continued)

(52) U.S. Cl.
CPC ............. *B23C 3/16* (2013.01); *B23C 1/12* (2013.01); *B23C 1/20* (2013.01); *B23C 3/18* (2013.01);
(Continued)

(58) Field of Classification Search
CPC ......... B23C 2220/04; B23C 3/16–3/20; B23C 2270/18; Y10T 409/304424; Y10T 409/303752–303808; Y10T 29/49325
(Continued)

(56) References Cited

U.S. PATENT DOCUMENTS 6,869,259 B2 *  3/2005  Lebkuechner ............ B23C 3/18
                                                        29/889.23
7,704,021 B2 *  4/2010  Hollmann ................ B23C 3/18
                                                        29/889.23
(Continued)

FOREIGN PATENT DOCUMENTS

CN    101708559 A    5/2010
CN    102722137 A    10/2012
(Continued)

OTHER PUBLICATIONS

Machine translation of EP 0233555 A2, which EP '555 was published Aug. 26, 1987.*
(Continued)

*Primary Examiner* — Erica E Cadugan
(74) *Attorney, Agent, or Firm* — Merchant & Gould P.C.

(57) ABSTRACT

A tool (T) is provided with: a shaft-like tool body (11) having a first end portion (11a) extending along a central axis line (Ot) and attached to a main shaft, and a second end portion (11b) on an opposite side to the first end portion (11a); and a fore end portion (12) connected to the second end portion (11b) of the shaft-like tool body (11). The fore-end portion (12) includes a central portion (13) including a fore-end face (17) of the tool (T), and a plurality of blade portions (14) protruding radially outward from the central portion (13). A cutting blade of each blade portion (14) includes a main cutting blade (15) adjacent to the fore-end face (17). The main cutting blade (15) includes an outline that forms an angle of 30-150 degrees with respect to the central axis line (Ot) in a cross-sectional view including the central axis line (Ot).

3 Claims, 11 Drawing Sheets

(51) Int. Cl.
    *B23C 1/12*    (2006.01)
    *B23C 1/20*    (2006.01)
    *B23C 3/18*    (2006.01)
    *B23C 5/00*    (2006.01)
    *B23C 5/10*    (2006.01)

(52) U.S. Cl.
    CPC ............... *B23C 5/003* (2013.01); *B23C 5/10* (2013.01); *B23C 2210/0407* (2013.01); *B23C 2220/04* (2013.01); *B23C 2250/16* (2013.01); *B23C 2270/18* (2013.01); *Y10T 29/49325* (2015.01); *Y10T 409/303808* (2015.01); *Y10T 409/304424* (2015.01)

(58) Field of Classification Search
    USPC ................... 409/143, 131–132; 29/889.23
    See application file for complete search history.

(56) References Cited

U.S. PATENT DOCUMENTS

| | | | | |
|---|---|---|---|---|
| 7,832,968 | B2 * | 11/2010 | Glaesser | ............... B23C 3/18 409/193 |
| 9,011,051 | B2 * | 4/2015 | Bichsel | ............ B23Q 39/026 409/132 |
| 2004/0093727 | A1 | 5/2004 | Mola | |
| 2013/0099477 | A1 | 4/2013 | Horiguchi | |
| 2013/0177362 | A1 | 7/2013 | Cigni | |
| 2019/0126364 | A1 | 5/2019 | Takagi et al. | |
| 2020/0391309 | A1 | 12/2020 | Okada | |
| 2021/0078086 | A1 | 3/2021 | Ueno et al. | |

FOREIGN PATENT DOCUMENTS

| | | | |
|---|---|---|---|
| DE | 3816674 A1 | * | 11/1989 |
| EP | 0233555 A2 | * | 8/1987 |
| JP | 2001-328018 A | | 11/2001 |
| JP | 2013-035101 A | | 2/2013 |
| JP | 2014-40838 A | | 3/2014 |
| JP | 2019-153298 A | | 9/2019 |
| JP | 2019-198929 A | | 11/2019 |
| WO | 2012/001761 A | | 1/2012 |
| WO | 2018/042653 A | | 3/2018 |
| WO | 2019/116475 A1 | | 6/2019 |

OTHER PUBLICATIONS

International Search Report for PCT/JP2021/013983 (Jun. 8, 2021).

* cited by examiner (a)

(b)

(a)

(b)

CUTTING TOOL AND METHOD FOR MACHINING WORKPIECE

This application is a National Stage Application of PCT/JP2021/013983, filed Mar. 31, 2021, which claims benefit of priority to Application No. 2020-064561, filed Mar. 31, 2020, in Japan, and which applications are incorporated herein by reference. To the extent appropriate, a claim of priority is made to each of the above disclosed applications.

FIELD

The present disclosure relates to a cutting tool and a workpiece machining method.

BACKGROUND

A workpiece machined by a machine tool can have various holes. Various machining methods for such workpieces having holes have been proposed (refer to, for example, Patent Literature 1 to 3). Patent Literature 1 discloses a method for producing a closed impeller. A closed impeller has multiple curved flow paths in the interior thereof. In the production method of Patent Literature 1, these flow paths are formed by three tools (a first tool for rough cutting, a second tool used after the first tool, and a third tool used after the second tool to cut any remaining portions). In particular, the third tool also has a blade (rear blade) in the portion facing the handle of the tool. Thus, the third tool can be used both in the direction entering the flow path and in the direction exiting the flow path. Any portions remaining after rough cutting are cut with such a third tool.

Patent Literature 2 discloses a method for producing a rotor from a disk having an integral structure. In this method, a plurality of radial cavities are formed in the disk. When forming the cavities, a first tool first forms outer portions of the cavities, starting from the outer diameter of the disk. The first tool advances until it reaches an intermediate depth while performing continuous terrace formation machining. Next, a second tool starts at the inner diameter of the disk and reaches the outer portion of the cavity, thereby forming a cavity. Alternatively, the second tool may first form the inner portion of the cavity, starting from the inner diameter of the disk. In this case, the second tool advances until it reaches an intermediate depth while performing continuous terrace forming machining. The first tool then starts at the outer diameter of the disk and reaches the inner portion of the cavity, thereby forming the cavity.

Patent Literature 3 discloses a method for producing a closed impeller. In this production method, surface finishing of a compression flow path of the closed impeller is performed by end mill machining. In the end mill machining, a tool whose projected shape parallel to the central axis of the tool is substantially elliptical is used. When end mill machining is used, the tool machines the wall of the compressed flow path along a spiral path.

CITATION LIST

Patent Literature

[PTL 1] WO 2018/042653
[PTL 2] Japanese Unexamined Patent Publication (Kokai) No. 2014-40838
[PTL 3] Japanese Unexamined Patent Publication (Kokai) No. 2019-153298

SUMMARY

Technical Problem

Holes formed in workpieces can often be curved or thin. When machining such a hole, a thin tool may be necessary. Using a thin tool can cause the tool to vibrate, for example, when increasing the machining speed or the depth of cutting. Thus, when machining a hole as described above, it may be difficult to efficiently machine the workpiece.

In consideration of the problems described above, the present disclosure aims to provide a cutting tool and a machining method with which holes formed in a workpiece can be efficiently machined.

Solution to Problem

As a result of research, the present inventors have discovered that vibration of the tool can be reduced by cutting the inner surface of the hole only when the tool moves inward from the aperture of the hole. Furthermore, the present inventors have discovered that in this method, if the tilt angle of the tool (the angle between the movement direction of the tool and the central axis of the tool when viewed from the direction of a line perpendicular to the surface to be machined) is 120 to 240°, tool vibration can be reduced. The present inventors have further discovered that the reduction in tool vibration is due to the low radial cutting force. Thus, the present inventors have conceived that if a tool capable of reducing the cutting force in the radial direction is used in the above method, tool vibration may be further reduced.

An aspect of the present disclosure based on the findings described above provides a tool which is attached to a spindle of a machine tool and which is used for machining a hole formed in a workpiece, the tool comprising a shaft-shaped tool body having a first end which extends along a central axis and which is for attachment to the spindle, and a second end on a side opposite the first end, and a tip connected to the second end of the shaft-shaped tool body, wherein the tip has a central part including a tip surface of the tool, and a plurality of blade parts which protrude radially outwardly from the central part in the circumferential direction, a cutting edge of each blade part includes a main cutting edge adjacent to the tip surface, and each main cutting edge has a contour forming a predetermined angle by which half of a cutting force or more in a feed direction acting on the main cutting edge is converted into a cutting force in the central axis direction when the tip of the tool is fed inward from an aperture of the hole relative to the central axis in a cross-sectional view including the central axis.

When the tool is moved inward from the aperture of the hole in accordance with the above method, the main cutting edge adjacent to the tip surface of the tool mainly receives the cutting force (feed component force). In the tool described above, the main cutting edge has a contour which forms a predetermined angle, for example, 30 to 150°, relative to the central axis by which half of a cutting force or more in a feed direction acting on the main cutting edge is converted into a cutting force in the central axis direction. Thus, half of the cutting force (feed component force) or more can be converted into a cutting force in the central axis direction. Therefore, the radial cutting force applied to the tool is reduced. As a result, vibration of the tool can be reduced, whereby the hole formed in the workpiece can be efficiently machined.

Another aspect of the present disclosure provides a machining method for machining a hole formed in a workpiece, comprising the steps of (i) preparing a tool comprising a shaft-shaped tool body having a first end which extends along a central axis and which is for attachment to a spindle of a machine tool, and a second end on a side opposite the first end, and a tip connected to the second end of the shaft-shaped tool body, the tip having a plurality of blade parts, (ii) attaching the tool to a spindle of a machine tool, (iii) arranging the tool relative to the aperture of the hole formed in the workpiece at a tilt angle, which represents an angle between a movement direction of the tool and the central axis of the tool, of 120 to 240° when viewed in a direction of a line perpendicular to a surface to be machined, (iv) moving the tool along an inner surface of the hole from the aperture of the hole toward the interior thereof to machine the inner surface, (v) returning the tool from the interior of the hole toward the aperture in a state in which the tool is separated from the inner surface of the hole, and (vi) moving the tool along a peripheral edge of the aperture of the hole at a predetermined pick feed, wherein steps (iii) to (vi) are repeated multiple times.

According to this method, the inner surface of the hole is machined only when the tool moves inward from the aperture of the hole. Furthermore, the tilt angle is set to 120 to 240°. Thus, according to the above findings of the present inventors, vibration of the tool can be reduced, whereby the hole formed in the workpiece can be efficiently machined.

Step (i) may comprises determining a shape of the tip based on a shape of the aperture of the hole, and determining a shape of the shaft-shaped tool body so that it does not interfere with the inner surface of the hole when the tip is arranged at a deepest position in the hole which the tip can reach, and so as to maximize the thickness thereof. In this case, the shape of the tool can easily be determined.

The tip of the tool may have a central part including a tip surface of the tool, the plurality of blade parts may protrude radially outwardly from the central part, a cutting edge of each blade part may include a main cutting edge adjacent to the tip surface, each main cutting edge may have a contour forming an angle of 30 to 150° relative to the central axis in a cross-sectional view including the central axis, step (iii) may comprise setting a lead angle representing an angle between the line perpendicular to the surface to be machined and the central axis of the tool, and the pick feed P of step (vi) may be calculated from the following formula:

$$P = \sqrt{\frac{8RH}{\cos(90 - \theta_l)}} \quad \text{[Math 1]}$$

where R: the radius between the central axis of the tool and an outermost diameter of the blade part, H: cusp height, θt: tilt angle, and θl: lead angle. In the tool according to the aspect of the present disclosure, since the cutting width can vary depending on the tilt angle and the lead angle, the desired cusp height (surface roughness) is achieved using a pick feed geometrically determined from the above formula. Thus, the desired surface roughness can be obtained.

Advantageous Effects of Invention

According to the present disclosure, a hole formed in a workpiece can efficiently be machined.

DESCRIPTION OF EMBODIMENTS

A tool and workpiece machining method according to an embodiment will be described below with reference to the attached drawings. Identical or corresponding elements have been assigned the same reference signs, and duplicate descriptions thereof have been omitted. To facilitate understanding, the scales of the drawings have been modified in some cases.

Figure 1:
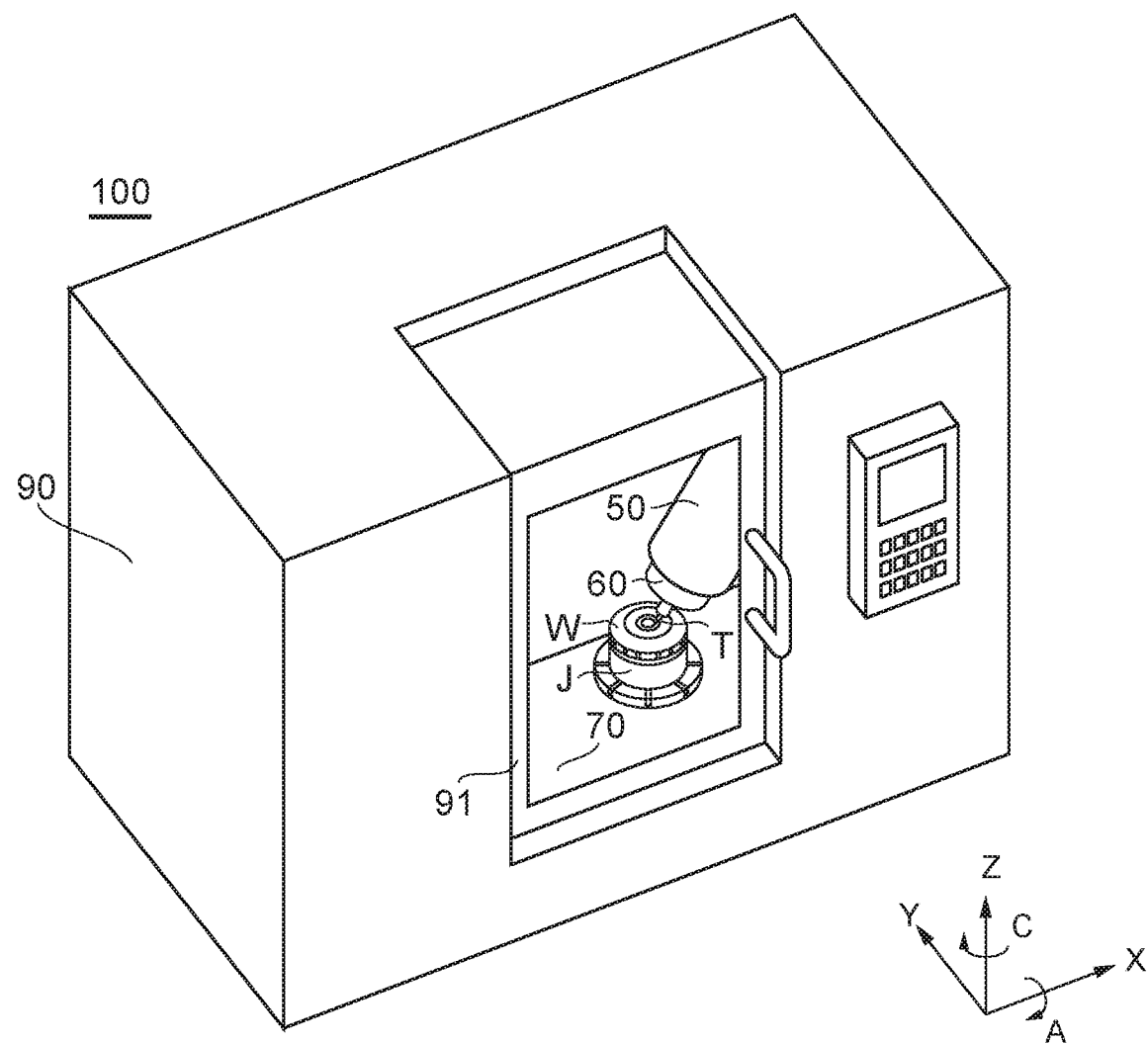
FIG. 1 is a perspective view showing a machine tool to which the machining method according to an embodiment is applied.

FIG. 1 is a perspective view showing a machine tool to which a machining method according to an embodiment is applied. The machining method according to the present disclosure can be realized by, for example, a machining center 100. However, the machining method according to the present disclosure may be realized by a machine tool other than a machining center (for example, a machine tool comprising three mutually orthogonal linear feed shafts and at least two rotational feed shafts). The machining center 100 has three linear feed shafts and two rotary feed shafts which, for example, move a spindle head 50 linearly in the X-, Y- and Z-axis directions, and rotate it in the A-axis direction about the X-axis and in the C-axis direction about the Z-axis. In another embodiment, a table 70 may be moved or rotated in some of the above five axes. A spindle 60 is rotatably supported on the spindle head 50, and a tool T is attached to the spindle 60. A workpiece W is mounted on the table 70 by a jig J. The spindle head 50 and the table 70 and other components supporting them (for example, a bed, column, etc.) are arranged in a cover 90, and an operator can access the workpiece W on the table 20 through a door 91.

Figure 2:
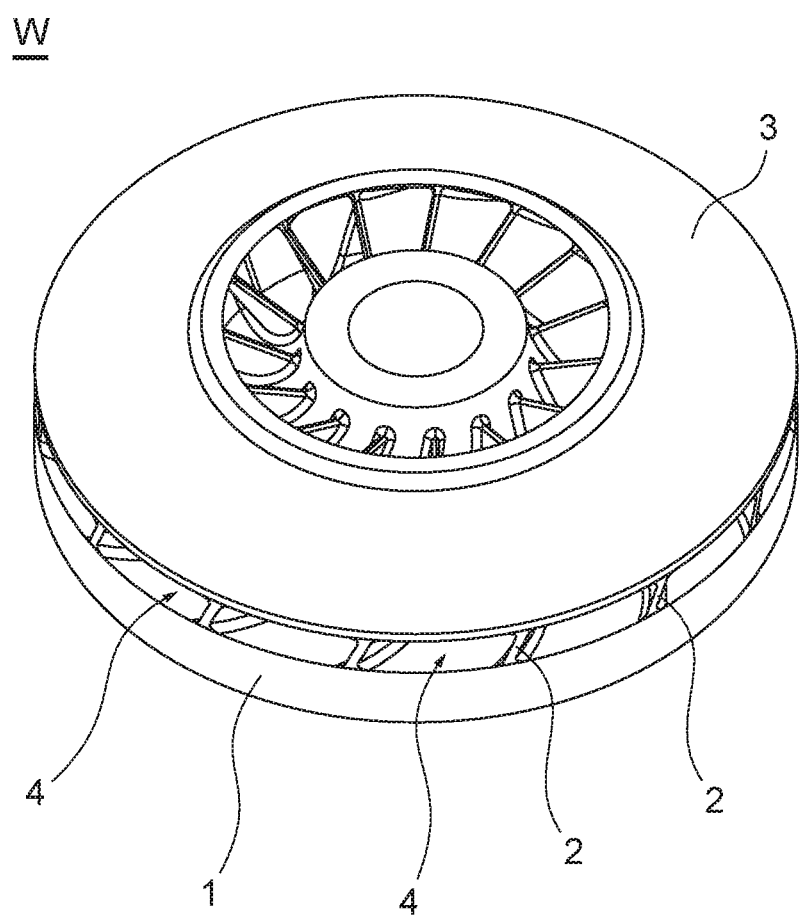
FIG. 2 is a perspective view showing an example of a workpiece.

FIG. 2 is a perspective view showing an example of a workpiece, and shows the shape of the workpiece after machining has completed. In this embodiment, a closed impeller W is machined by the machine tool 100 described above. The closed impeller W comprises a hub 1, a plurality of blades 2, a shroud 3, and a plurality of flow paths (holes) 4. The hub 1, the blades 2, and the shroud 3 are integrated and form from one workpiece. Each flow path 4 is defined by the hub 1, a pair of blades 2, and the shroud 3. The flow paths 4 are curved and penetrate between the outer peripheral part and the inner peripheral part of the closed impeller W. In the machining method of the present embodiment, the flow paths 4 of the closed impeller W are formed by the tool T. However, the machining method of the present disclosure is not only applicable to the formation of the flow paths 4 of the closed impeller W, but also to machining of various workpieces having holes, which may be machining of the inner surface of a tube or cylinder. Furthermore, in the present disclosure, the term "hole" is not limited to penetrating holes, and may include holes in Which one end has an aperture but the other end is closed. For example, a hole may have a shape that is difficult for a thick tool to access the interior thereof, such as curved holes or thin holes, but is not limited thereto.

Figure 3:
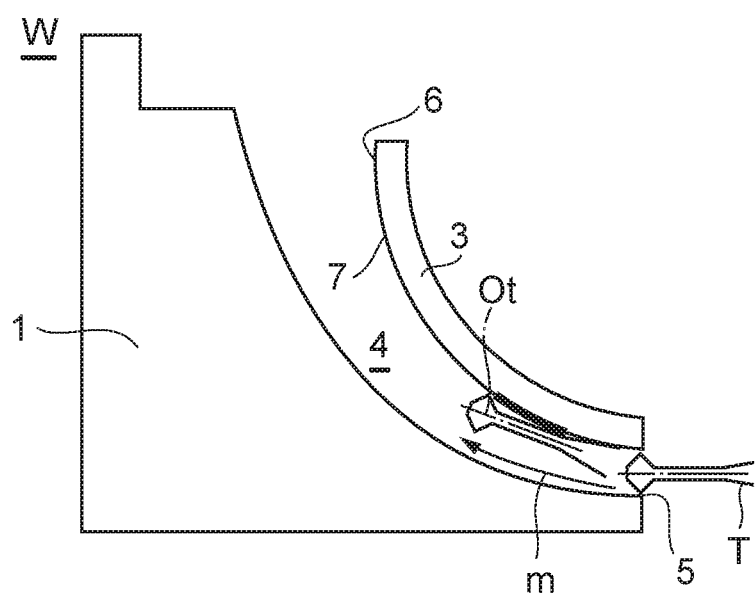
FIG. 3(a) is a schematic cross-sectional view showing a machining method according to an embodiment.
FIG. 3(b) is a schematic perspective view showing a machining method according to an embodiment.
Figure 3:
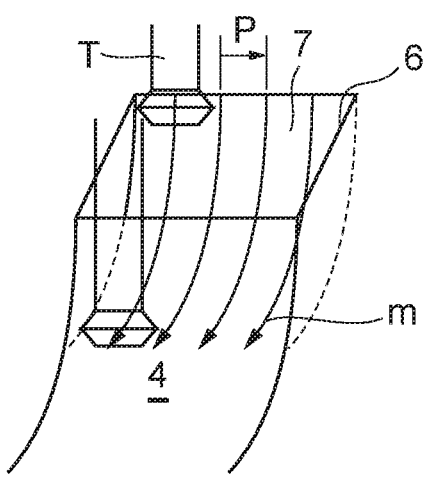

FIG. 3(a) is a schematic cross-sectional view showing a machining method according to an embodiment, and FIG. 3(b) is a schematic perspective view showing the machining method according to the embodiment. When forming a flow path 4 as described above in the closed impeller W, first, a hole (lower hole) is opened from both the outer peripheral side and the inner peripheral side by a first tool (not shown) such as a drill, thereby forming a through hole. Next, an inner surface 7 is machined from an aperture 5 on the outer peripheral side to the middle part of the through hole by the second tool T, and the second tool T (or another tool) machines the inner surface 7 from an aperture 6 on the inner peripheral side to the middle part of the through hole, thereby forming a flow path 4. The machining method may include an additional finishing step using yet another tool. The present inventors have discovered, as a result of investigation, that when forming a flow path 4 using the tool T, as shown in FIGS. 3(a) and 3(b), vibration of the tool can be reduced by machining the inner surface 7 of the hole (so-called "thrust machining") only when the tool moves from the apertures 5, 6 toward the interior of the hole. The basis for this finding will be described below.

Figure 4:
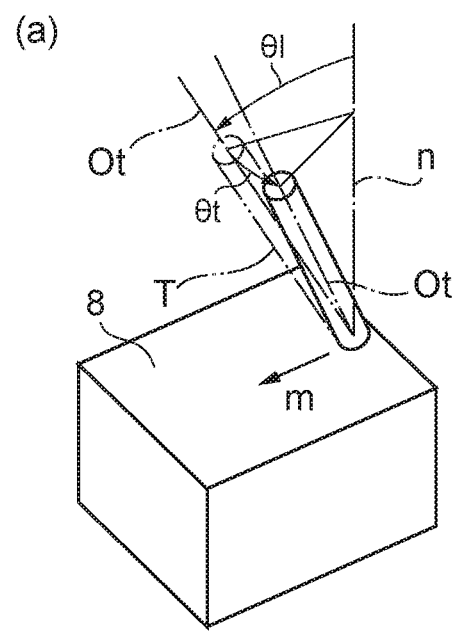
FIG. 4(a) is a schematic perspective view showing a lead angle and a tilt angle.
FIG. 4(b) is a schematic plan view showing a tilt angle.
Figure 4:
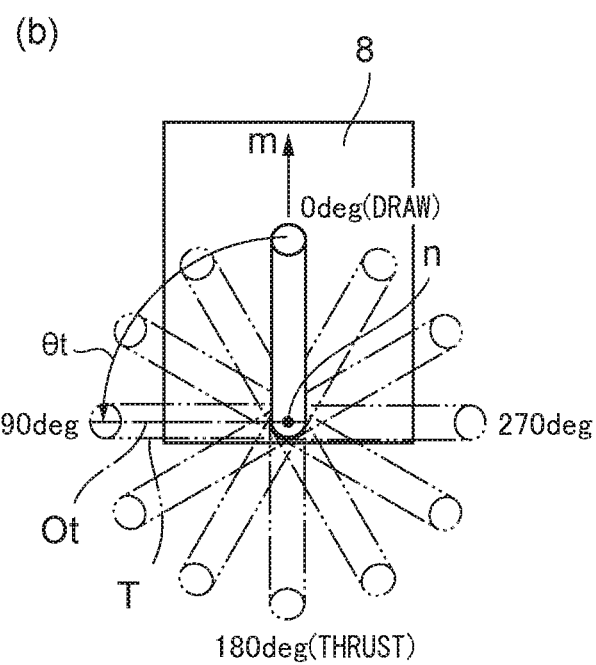

FIG. 4(a) is a schematic perspective view showing a lead angle and a tilt angle, and FIG. 4(b) is a schematic plan view showing the tilt angle. As shown in FIG. 4(a), the lead angle θl represents the angle between a line n perpendicular to a surface 8 to be machined and the central axis Ot of the tool T. As shown in FIG. 4(b), the tilt angle θt represents the angle between the moving direction m of the tool T and the central axis Ot of the tool when viewed from the direction of the line n perpendicular to the surface 8 to be machined. The present inventors machined the surface 8 by moving the tool T along the direction in at various tilt angles θt, and measured the surface roughness Ra of the surface 8 and the cutting force applied to the tool T at each tilt angle θt. The lead angle θl was fixed at 30°. For the measurement, a general lollipop mill having a substantially spherical tip shape was used.

Figure 5:
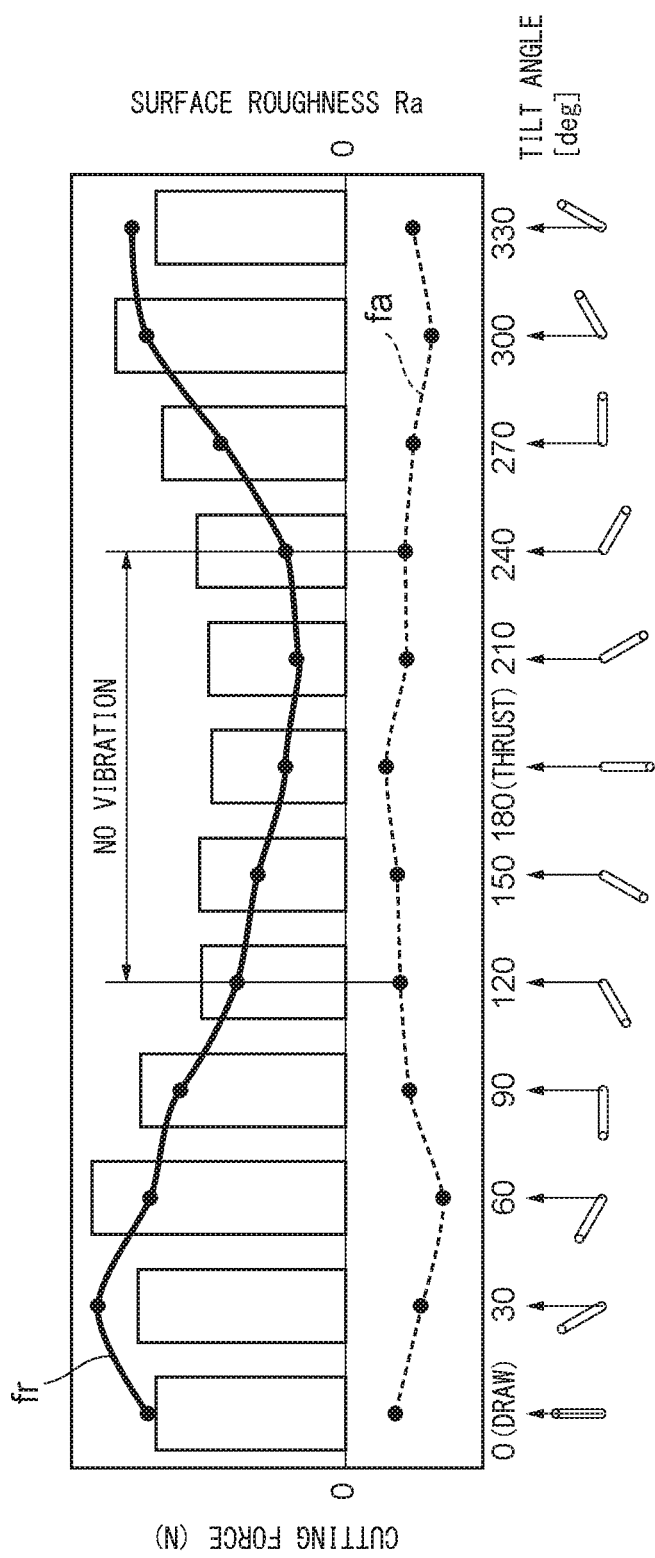
FIG. 5 is a graph showing the relationship of tilt angle with surface roughness and cutting force.

FIG. 5 is a graph showing the relationship of tilt angle with surface roughness and cutting force. The horizontal axis represents the tilt angle, and the vertical axis represents the cutting force (scale on the left side) and surface roughness (arithmetic mean roughness, scale on the right side). The bar graph indicates surface roughness Ra, the solid line indicates the radial cutting force fr, and the broken line indicates the axial cutting force fa. As can be seen from FIG. 5, the surface roughness Ra is small and constant in the tilt angle θt range of 120° to 240°, and no vibrations are generated in this range. Further, in this range, the cutting force fr in the radial direction is also low, and it is presumed that the vibration is reduced as a result. The present inventors have conceived to apply this result to the machining of the flow path 4 described above.

As shown in FIG. 3(a), when a flow path 4 is machined by the tool T, the tool T is generally arranged so that the central axis Ot of the tool T is substantially parallel to the inner surface 7 of the hole and the tip of the tool T leads in the movement direction. In order to set the tilt angle θt to 120° to 240° in such a posture based on the above findings, it is necessary that the tool T machine the inner surface 7 of the hole only when the tool T moves from the apertures 5, 6 toward the interior of the hole. Thus, as shown in FIG. 3(b), the present inventors have conceived of moving the tool T from the apertures 5, 6 toward the interior of the hole to machine the inner surface 7, then returning the tool T to the apertures 5, 6, and moving the tool T along the apertures 5, 6 at a predetermined pick feed P, and repeating these operations.

Referring to FIG. 5, as described above, it is presumed that the reduction in vibration of the tool T is caused by the low cutting force fr in the radial direction. Thus, the present inventors have conceived that when the flow path 4 is machined according to the above method, vibration of the tool T may be further reduced by using a tool T which can reduce the cutting force fr in the radial direction.

As shown in FIG. 3(a), when the tool T is moved from the aperture 5 toward the interior of the hole to machine the inner surface 7, the tip of the cutting edge mainly receives the cutting force (feed component force). Thus, the present inventors have conceived to reduce the radial cutting force by making the shape of this portion easy to receive the cutting force (feed component force) in the axial direction.

FIG. 6(a) is a schematic side view showing a tool according to an embodiment, FIG. 6(b) is an enlarged cross-sectional view of portion D, and FIG. 6(c) is an enlarged view of portion D. It should be noted that in FIG. 6(a), the contour is drawn when the tool T is rotated around the central axis Ot (the same applies to FIGS. 7(a) and 8(a), which are described later). With reference to FIG. 6(a), the tool T includes a shaft-shaped tool body 11 and a tip 12. For example, the tool T can be an integral body. The shaft-shaped tool body 11 extends along the central axis Ot of the tool. The shaft-shaped tool body 11 has a first end 11a for attachment to the spindle 60 of the machining center 100 and a second end 11b opposite to the first end 11a. The tip 12 is connected to the second end 11b of the shaft-shaped tool body 11.

Referring to FIGS. 6(b) and (c), The tip 12 has a central part 13 and a plurality of blade parts 14. The central part 13 is located on the central axis Ot. The central part 13 includes a tip surface 17 of the tool T. The tip surface 17 is a flat surface. The tip surface 17 does not include the cutting edge. The blade parts 14 protrude radially outward from the central part 13. In the present embodiment, the tool T includes four blade parts 14 along the circumferential direction. The cutting edges of the blade parts 14 each include a main cutting edge 15 and a sub cutting edge 16. The main cutting edge 15 is adjacent to the tip surface 17. The main cutting edge 15 faces the direction away from the shaft-shaped tool body 11 in the direction parallel to the central axis Ot, and the sub cutting edge 16 faces the shaft-shaped tool body 11 in the direction parallel to the central axis Ot. The main cutting edge 15 and the sub cutting edge 16 are linear.

In a cross-sectional view including the central axis Ot, the angle θ1 between the main cutting edge 15 and the central axis Ot is 150°. Thus, when machining a flow path 4 of the closed impeller W as described above, half of the cutting force (feed component force) applied to the main cutting edge 15 is converted into a cutting force in the axial direction (when the lead angle is 90° and the tilt angle is 180°). Therefore, the cutting force in the radial direction can be reduced. The angle between the main cutting edge 15 and the sub cutting edge 16 is, for example, approximately 90°. The corners between the main cutting edge 15 and the still cutting edge 16 are rounded.

Figure 6:
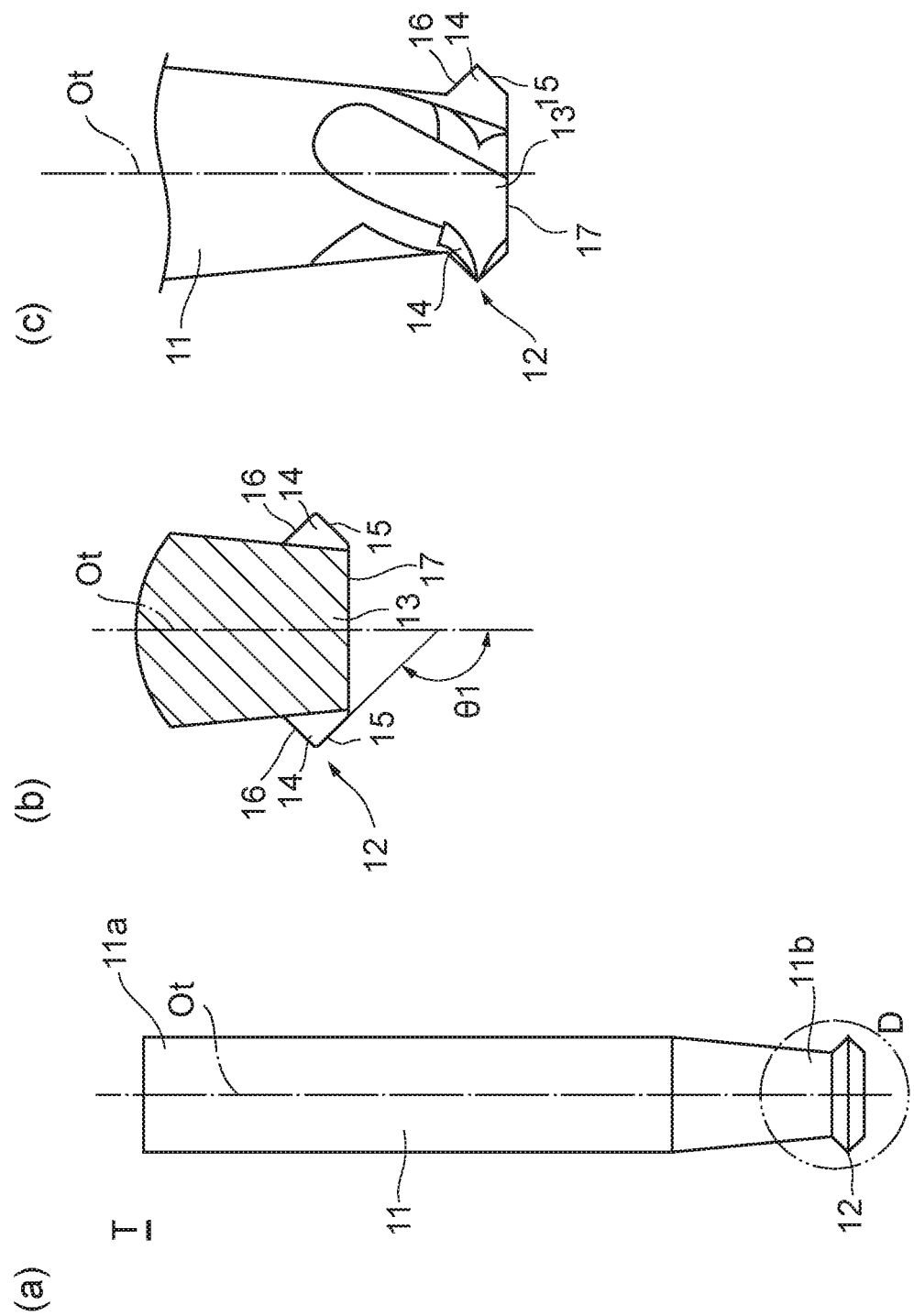
FIG. 6(a) is a schematic side view showing a tool according to an embodiment.
FIG. 6(b) is an enlarged cross-sectional view of portion D.
FIG. 6(c) is an enlarged view of portion D.
Figure 7:
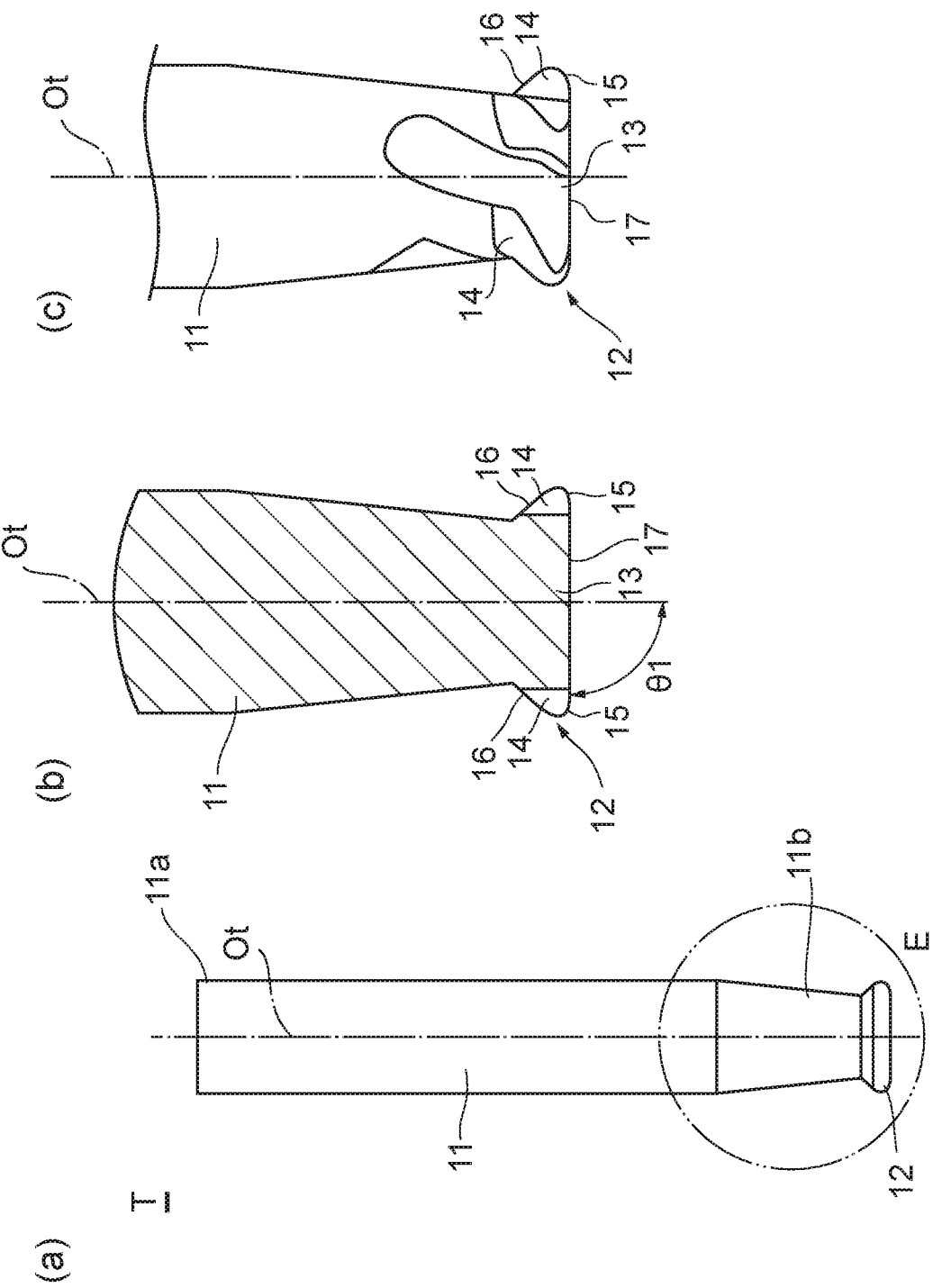
FIG. 7(a) is a schematic side view showing a tool according to another embodiment.
FIG. 7(b) is an enlarged cross-sectional view of portion E.
FIG. 7(c) is an enlarged view of portion E.

FIG. 7(a) is a schematic side view showing a tool according to another embodiment, FIG. 7(b) is an enlarged cross-sectional view of portion E, and FIG. 7(c) is an enlarged view of portion E. The embodiment of FIG. 7 differs from the embodiment of FIG. 6 in that the shape of the blade part 14 is different. Other points may be the same as those of the embodiment of FIG. 6.

Referring to FIGS. 7(b) and (c), the main cutting edge 15 of the present embodiment includes a linear portion on the inner side in the radial direction and an arcuate portion on the outer side in the radial direction. The sub cutting edge 16 includes a radial outer arcuate portion continuous with the arcuate portion of the main cutting edge 15, and a radial inner linear portion. The linear portion of the main cutting edge 15 is perpendicular to the central axis Ot. Thus, the angle θ1 between the linear portion of the main cutting edge 15 and the central axis Ot is 90°. Therefore, when a flow path 4 of the closed impeller W is machined as described above, the cutting force (feed component force) applied to the linear portion of the main cutting edge 15 is in the axial direction (when the lead angle is 90° and the tilt angle is 180°). Thus, the cutting force in the radial direction can be reduced. Furthermore, even in the arcuate part of the main cutting edge 15, the portion from the central axis Ot to 30° about the center of the arc is formed by a contour (tangent line) forming an angle of 90° to 150° relative to the central axis Ot. Likewise, in these portions, the cutting force in the radial direction can be reduced. The linear portion of the sub cutting edge 16 forms an angle of, for example, approximately 30° relative to the central axis Ot.

Figure 8:
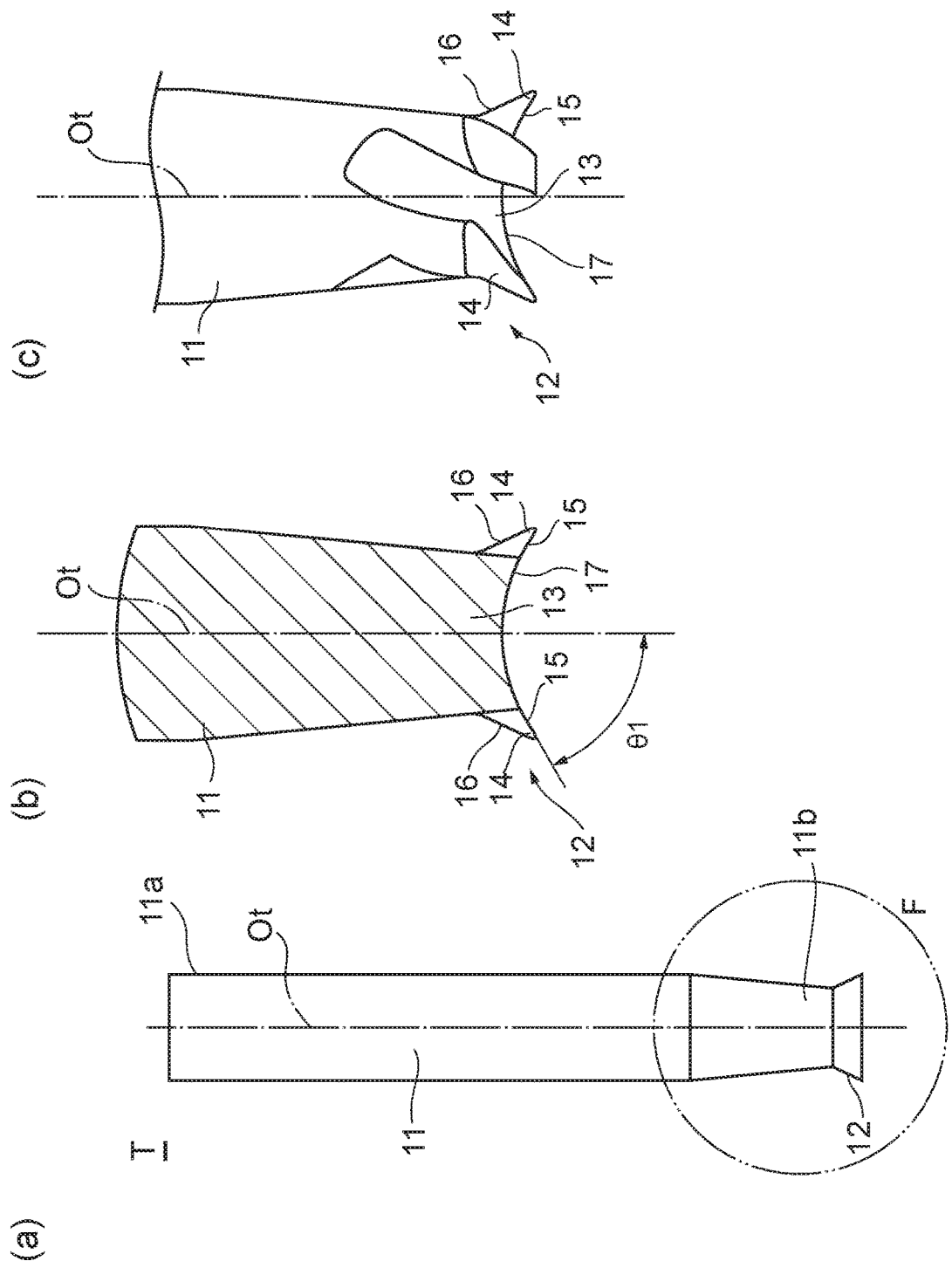
FIG. 8(a) is a schematic side view showing a tool according to yet another embodiment.
FIG. 8(b) is an enlarged cross-sectional view of portion F.
FIG. 8(c) is an enlarged view of portion F.

FIG. 8(a) is a schematic side view showing a tool according to yet another embodiment, FIG. 8(b) is an enlarged cross-sectional view of portion F, and FIG. 8(c) is an enlarged view of portion F. The embodiment of FIG. 8 differs from the embodiment of FIG. 6 in that the tip surface 17 of the tool T is a curved surface (concave surface) and the shape of the blade part 14 is different. The other points may be the same as those of the embodiment of FIG. 6.

Referring to FIGS. 8(b) and (c), the main cutting edge 15 and the sub cutting edge 16 are linear. The angle θ1 between the main cutting edge 15 and the central axis Ot is 60°. Thus, when machining the flow path 4 of the closed impeller W as described above, most of the cutting force (feed component force) applied to the main cutting edge 15 is converted in the axial direction (when the lead angle is 90° and the tilt angle is 180°). Therefore, the cutting force in the radial direction can be reduced. The angle between the main cutting edge 15 and the sub cutting edge 16 is, for example, approximately 30°. The corners between the main cutting edge 15 and the sub cutting edge 16 are rounded.

Next, a pick feed calculation method will be described.

Figure 9:
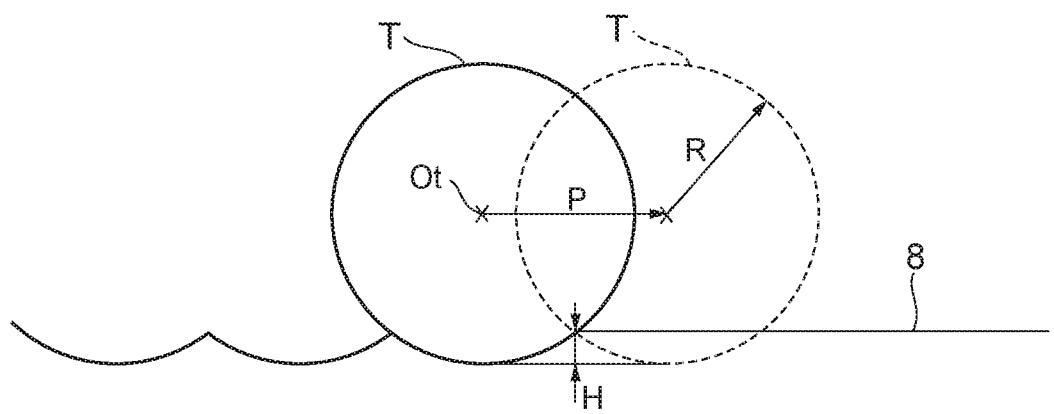
FIG. 9 is a schematic view showing a method for calculating pick feed.

FIG. 9 is a schematic diagram showing a pick feed calculation method, and shows a tool T which machines the surface 8 with a lead angle θl of 90° and a tilt angle θt of 180°. In FIG. 9, when machining the surface 8, the tool T moves in the direction perpendicular to the surface of the sheet, and the pick feed P is in the right direction. R represents the radius between the central axis Ot of the tool T and the outermost diameter of the blade part 14, and H represents the cusp height (the height of the convex portion remaining on the surface 8). In the state of FIG. 9, the pick feed P is geometrically obtained by the following formula (1).

[Math 2]

$$P = \sqrt{8RH} \quad (1)$$

In the tool according to the embodiment as shown in FIGS. 6 to 8, when the tilt angle θt becomes less than (or greater than) 180° from the state of FIG. 9, the cutting width becomes small. Further, when the lead angle θl is less than 90° from the state of FIG. 9, the cutting width becomes large. When changes in the tilt angle θt and the lead angle θl are taken into consideration, the pick feed P is geometrically obtained by the following formula (2).

[Math 3]

$$P = \sqrt{\frac{8RH}{\cos(90 - \theta_t)}} \quad (2)$$

Thus, by calculating the pick feed P by formula (2) above, a surface having a desired cusp height can be obtained.

Next, a workpiece machining method according to an embodiment will be described.

Figure 10:
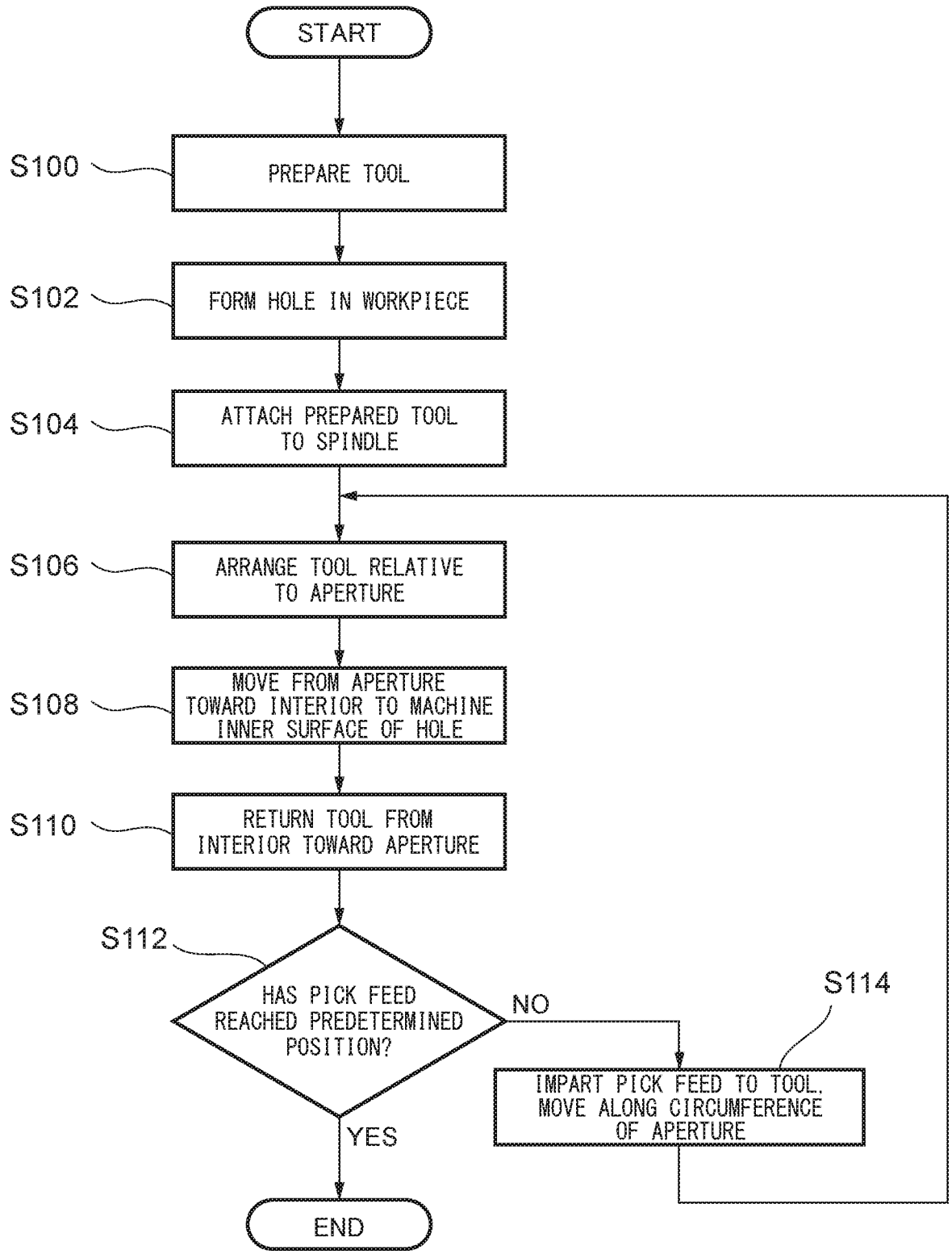
FIG. 10 is a flowchart showing a machining method according to an embodiment.

FIG. 10 is a flowchart showing a machining method according to an embodiment. The operation of the machining center 100 shown below may be executed according to, for example, an NC program, or may be performed by an operator. First, the operator prepares a tool (second tool) T as described above (step S100). The details of step S100 will be described later.

Next, the machining center 100 forms a hole (lower hole) in the workpiece W with a first tool such as a drill (step S102). Thereafter, for example, the first tool is removed from the spindle 60 by an automatic tool changer (not illustrated) or by the operator, and the prepared second tool T is attached to the spindle 60 (step S104).

The machining center 100 next arranges the tool T at a predetermined tilt angle θt in the range of 120° to 240° (for example, 180°) and a predetermined lead angle θl greater than 0° and less than or equal to 90° (for example, 90°) relative to the aperture 5 formed in the outer circumference of the workpiece W (step S106). In step S106, the tool T may be in contact with or separated from the inner surface 7 of the hole.

Next, the machining center 100 moves the tool T along the inner surface 7 from the aperture 5 toward the interior of the hole to machine the inner surface 7 (step S108). The machining center 100 continues the machining to a predetermined depth.

The machining center 100 next returns the tool T from the interior of the hole toward the aperture 5 in a state in which the tool T is separated from the inner surface 7 of the hole (step S110). For example, the machining center 100 may return the tool T to the position where the tool T was arranged in step S106.

Until the position of the predetermined pick feed specified by the machine program is reached (step S112), the machining center 100 imparts a pick feed P calculated by the above formula (2) to the tool T, moves it along the peripheral edge of the aperture 5 (step S114), and repeats steps S106 to S110.

When the predetermined pick feed position is reached in step S112, the machining center 100 ends the series of operations. The machining center 100 may perform the same operation as described above from the aperture 6 on the inner circumference using the same tool T (or a different tool).

Next, step S100 in which the tool is prepared will be described.

FIGS. 11(a) to 11(d) are schematic views showing the steps for preparing the tool. Step S100 in which the tool is prepared may be executed, for example, in CAD by an operator or in accordance with a program.

Figure 11:
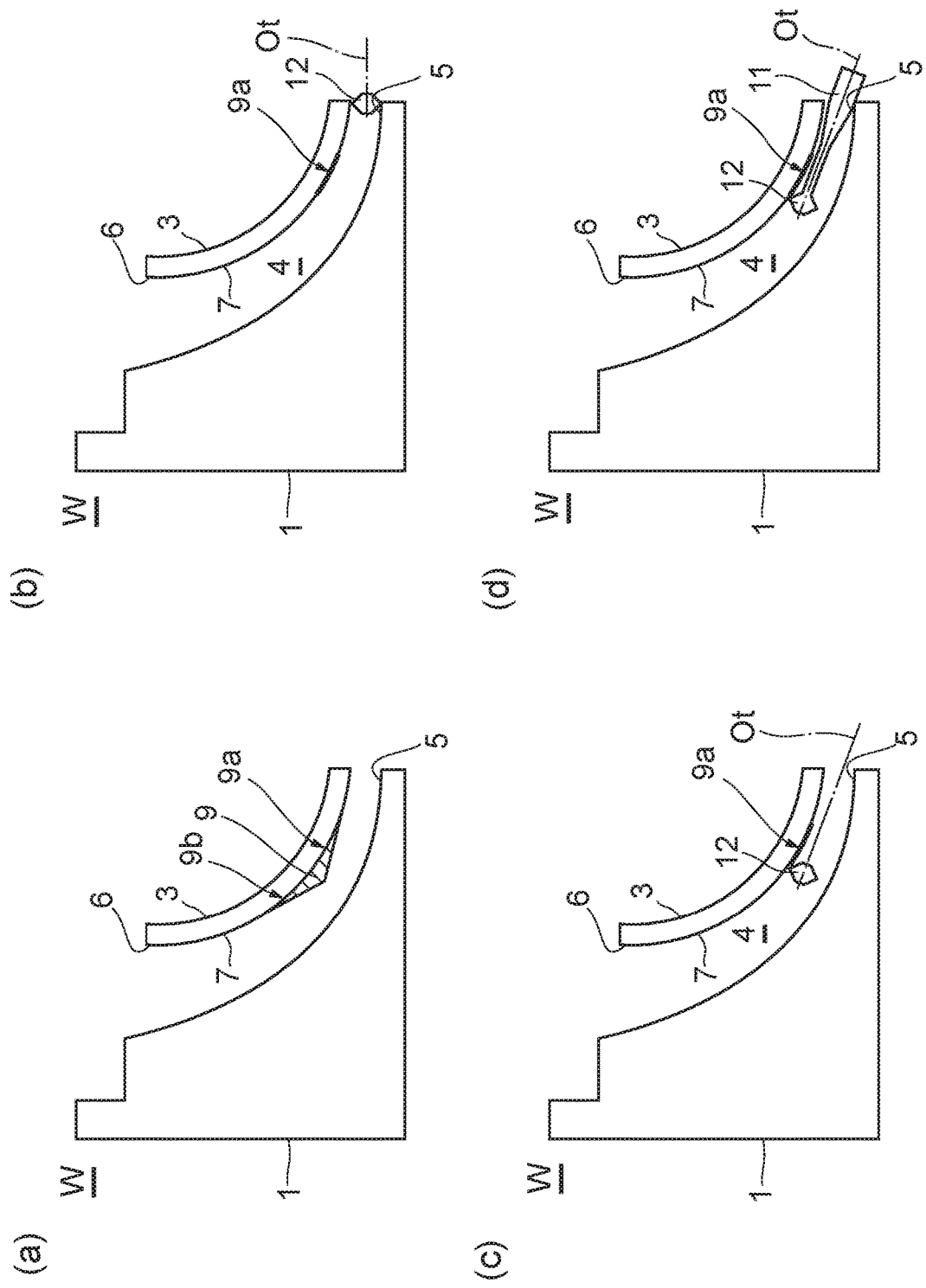
FIGS. 11(a) to (d) are schematic views showing steps for preparing a tool.

Referring to FIG. 11(a), first, the shape of the hole (lower hole) formed in step S102 is acquired. A remaining part 9 which was not machined by the first tool remains in the hole. Based on the shape of the remaining part 9, the region 9a to be machined by the tool inserted from the aperture 5 and the region 9b to be machined by the tool inserted from the aperture 6 are determined. Below, the tool to be inserted from the aperture 5 is prepared. However, the tool to be inserted from the aperture 6 may be prepared by the same method.

Referring to FIG. 11(b), next, the shape of the tip 12 of the tool T is determined based on the shape of the aperture 5. For example, the shape of the tip 12 is determined so that the tip 12 does not interfere with the aperture 5 when the tip 12 is arranged relative to the aperture 5 at a predetermined tilt angle (for example, 180°) and lead angle (for example 90°).

Referring to FIG. 11(c), next, the tip 12 is arranged at the deepest position in the hole which the tip 12 can reach. For example, the tip 12 is arranged so as to contact the deepest part of the region 9a.

With reference to FIG. 11(d), the shape of the shaft-shaped tool body 11 is determined so as not to interfere with the inner surface 7 and so as to maximize the thickness thereof. At this time, the tilt angle and the lead angle may be adjusted. Furthermore, when the determined tool T is moved from the aperture 5 toward the interior of the hole along the inner surface 7 in CAD, it may be determined whether or not portions of the tool T other than the cutting edge interfere with the inner surface 7. If interference occurs, the operator may adjust the shape of the shaft-shaped tool body 11.

When the tool T is moved from the aperture 5 of the hole toward the interior in accordance with the machining method according to the above embodiment, the main cutting edge 15 adjacent to the tip surface 17 of the tool mainly receives the cutting force (feed component force). In the tool T shown in FIGS. 6 to 8, the main cutting edge 15 includes a contour forming an angle of 30° to 150° relative to the central axis Ot. Thus, more than half of the cutting force (feed component force) can be converted into an axial cutting force. Therefore, the radial cutting force applied to the tool T is reduced. As a result, vibration of the tool T can be reduced, and the hole formed in the workpiece W can be efficiently machined.

Furthermore, according to the machining method according to the embodiment, the inner surface 7 of the hole is machined only when the tool T moves inward from the aperture 5 of the hole. Furthermore, the tilt angle θt is set to 120° to 240°. Thus, according to the findings of the present inventors based on the result of FIG. 5, vibration of the tool T can be reduced, and the hole formed in the workpiece W can be efficiently machined.

Furthermore, in the machining method according to the embodiment, Step S100 includes determining the shape of the tip 12 based on the shape of the aperture 5 of the hole, and determining the shape of the shaft-shaped tool body 11 so as not to interfere with the inner surface 7 and when the tip 12 is arranged at the deepest position in the hole which the tip 12 can reach and so as to maximize the thickness thereof. Thus, the shape of the tool T can be easily determined.

Furthermore, in the machining method according to the embodiment, step S106 includes setting the predetermined tilt angle θt and lead angle θl, and the pick feed P of step (vi) is calculated by formula (2) above. In each tool according to the embodiments as shown in FIGS. 6 to 8, since the desired cusp height (surface roughness) is achieved by using the pick feed P geometrically obtained with formula (2) above, the desired surface roughness can be obtained by using the pick feed P obtained with formula (2) in step S114.

Though embodiments of the tool and workpiece machining method have been described, the present invention is not limited to the embodiments described above. A person skilled in the art would understand that various modifications can be made to the embodiments described above. Furthermore, a person skilled in the art would understand that the steps described above need not be performed in the order described above, but can be performed in any other order as long as no conflicts are brought about thereby.

For example, in the machining method according to the above embodiment, each tool T shown in FIGS. 6 to 8 is used. However, in the machining method according to another embodiment, another general tool (for example, a lollipop mill) may be used.

REFERENCE SIGNS LIST

4 Flow Path (Hole)
5 Aperture
6 Aperture
7 Hole Inner Surface
11 Shaft-Shaped Tool Body
11a Shaft-Shaped Tool Body First End
11b Shaft-Shaped Tool Body Second End
12 Tip
14 Blade Part
15 Main Cutting Edge
17 Tool Tip Surface
60 Spindle
100 Machining Center (Machine Tool)
n Line Perpendicular To Surface To Be Machined
OT Tool Central Axis
P Pick Feed
T Tool
W Closed Impeller (Workpiece)
θ1 Angle of The Contour of Main Cutting Edge Relative To Central Axis
θl Lead Angle
θt Tilt Angle

The invention claimed is:

1. A machining method for machining a hole formed in a workpiece, comprising the steps of:
   (i) preparing a tool comprising a shaft-shaped tool body having a first end which extends along a central axis and which is for attachment to a spindle of a machine tool, and a second end on a side opposite the first end, and a tip connected to the second end of the shaft-shaped tool body, the tip having a plurality of blade parts in the circumferential direction, (ii) attaching the tool to a spindle of a machine tool, (iii) arranging the tool relative to an aperture of the hole formed in the workpiece at a tilt angle, which represents an angle between a movement direction of the tool and the central axis of the tool, of 120 to 240° when viewed in a direction of a line perpendicular to a surface to be machined, (iv) moving the tool along an inner surface of the hole from the aperture of the hole toward the interior thereof to machine the inner surface, (v) returning the tool from the interior of the hole toward the aperture in a state in which the tool is separated from the inner surface of the hole, and (vi) moving the tool along a peripheral edge of the aperture of the hole at a predetermined pick feed, wherein steps (iii) to (vi) are repeated multiple times.

2. The machining method according to claim 1, wherein step (i) further comprises:

determining a shape of the tip based on a shape of the aperture of the hole, and determining a shape of the shaft-shaped tool body so that it does not interfere with the inner surface of the hole when the tip is arranged at a deepest position in the hole which the tip can reach, and so as to maximize the thickness thereof.

3. The machining method according to claim 1, wherein the tip of the tool has a central part including a tip surface of the tool, the plurality of blade parts protrude radially outwardly from the central part, a cutting edge of each blade part includes a main cutting edge adjacent to the tip surface, and each main cutting edge has a contour forming an angle of 30 to 150° relative to the central axis in a cross-sectional view including the central axis, the step (iii) comprises setting a lead angle representing an angle between the line perpendicular to the surface to be machined and the central axis of the tool, and the pick feed P of the step (vi) is calculated from the following formula:

$$P = \sqrt{\frac{8RH}{\cos(90 - \theta_l)}} \quad \text{[Math 1]}$$

where R: the radius between the central axis of the tool and an outermost diameter of the blade part, H: cusp height, θt: tilt angle, and θl: lead angle.

* * * * *